United States Patent [19]

Neuner et al.

[11] 4,255,234

[45] Mar. 10, 1981

[54] AUTOMATIC FLUX MAPPING SYSTEM

[75] Inventors: James A. Neuner, Gibsonia; Robert M. Oates, Murrysville, both of Pa.

[73] Assignee: Westinghouse Electric Corp., Pittsburgh, Pa.

[21] Appl. No.: 950,650

[22] Filed: Oct. 12, 1978

[51] Int. Cl.³ .................................................. G21C 17/00
[52] U.S. Cl. .................................................. 176/19 R
[58] Field of Search ............... 179/19 R, 19 EC, 19 J, 179/20 R, 22, 24; 250/390–392; 235/172.5

[56] References Cited

U.S. PATENT DOCUMENTS

| | | | |
|---|---|---|---|
| 3,751,333 | 8/1973 | Drummond et al. | 176/19 R |
| 3,769,156 | 10/1973 | Brecy | 176/19 R |
| 3,852,661 | 12/1974 | Szabo et al. | 176/19 R |
| 3,855,590 | 12/1974 | Neuner | 176/19 J |
| 3,858,191 | 12/1974 | Neuner et al. | 176/19 EC |
| 3,860,824 | 1/1975 | Stowe | 176/19 R |
| 3,888,772 | 6/1975 | Neuner | 176/20 |
| 3,930,936 | 1/1976 | Aleite et al. | 176/19 R |
| 3,932,211 | 11/1976 | Loving, Jr. | 176/19 R |
| 4,001,590 | 1/1977 | Corte et al. | 176/19 R |
| 4,105,496 | 8/1978 | Therowd | 176/19 R |

*Primary Examiner*—S. A. Cangialosi
*Attorney, Agent, or Firm*—M. P. Lynch

[57] ABSTRACT

In a nuclear reactor flux mapping system consisting of two operationally independent electronic subsystems for controlling the positioning of separate groups of in-core detectors within core thimbles, a communications link is provided between the two subsystems to enable one subsystem and its associated group of detectors to assume the flux mapping responsibility of the other subsystem in the event of a subsystem malfunction.

5 Claims, 4 Drawing Figures

AUTOMATIC FLUX MAPPING SYSTEM

CROSS-REFERENCE TO RELATED APPLICATION

The subject matter of this patent application is related to co-filed, copending Patent application Ser. No. 950,651, filed Oct. 12, 1978, by W. W. Wassel and G. W. Remley, entitled "Nuclear Reactor In Core Flux Mapping System", and assigned to the assignee of the present invention.

BACKGROUND OF THE INVENTION

In commercial nuclear reactors, it is necessary to periodically monitor the axial flux distribution as directly as possible throughout the core in order to perform proper fuel management as well as to monitor other conditions such as the rod position indication and the fixed in-core system. This task is presently performed by a movable in-core flux mapping system requiring substantial operator interaction for control and data reduction.

While numerous different detection techniques have been employed in the past, the control of the movable in-core detectors has generally fallen into one of two categories. For simple systems not requiring coordinated automatic control and data reduction of multiple detectors, individual control systems are provided for each drive mechanism and data reduction is generally a task left to the operator or a central plant computer. While this approach produces a degree of fault tolerance since a failure of one control system will not affect the others, this approach usually places a heavy burden on the plant computer. The operating personnel are burdened with detailed data reduction and control responsibility.

For automated systems, in which multiple detectors need to be controlled and their data reduced internally in a coordinated manner, a centralized data processing and control technique is usually employed to reduce the cost. Unfortunately, these systems are vulnerable to numerous single failures that can prevent or delay a flux map with a resulting penalty in plant performance. Fully redundant systems have also been considered but generally are not used due to excessive costs.

Thus, there is a strong need to provide an economical, fully automated, movable in-core flux mapping system with coordinated control of multiple detectors and internal data reduction as well as tolerance to single random device failures.

SUMMARY OF THE INVENTION

There is disclosed herein with reference to the accompanying drawings a novel technique that provides coordinated control of multiple detectors and internal data reduction using centralized processing techniques while not being vulnerable to single random device failures. The disclosed technique uses a partitioned system architecture to economically provide a fault tolerant automatic movable in-core flux mapping system for use in nuclear power plants.

The novel technique, as illustrated in the drawings is a partitioned system consisting of two separate and similar subsystems. Each subsystem contains its own central data processing and control function, typically employing microprocessors. While appearing to be a typical redundant system, it is unlike a redundant system in that the interfaces to the containment drive systems of a nuclear reactor are not duplicated. The interfaces, which constitute a major cost of a typical system, are provided only once and are associated with a particular drive mechanism. One half of the drive mechanisms are associated with each subsystem. The circuitry associated with each subsystem is designed to handle one-half of the drive and path transfer mechanisms at any one time. The drive and path transfer mechanisms of the subsystems are mechanically interconnected such that the transfer mechanisms and thimbles normally associated with one subsystem can be operated by and probed by the detectors associated with the other subsystem. In normal operation, each subsystem controls its respective drive and transfer mechanisms, and a full flux map is produced in a minimum time. Coordination of the two subsystems and transfer of data is accomplished by a simple multiport register, or "mailbox" technique, in which a failure of either subsystem will not prevent the other subsystem from performing its intended tasks.

If a failure occurs in one subsystem such that it can no longer control the drive mechanism normally associated with it, then the remaining subsystem can take a full flux map as a two-pass operation. The remaining operating subsystem will first probe the thimbles associated with its own drive and path transfer mechanisms. When this is completed the operator will manually switch control such that the surviving subsystem can automatically probe all the remaining thimbles normally associated with the inoperative subsystem. The only penalty for this mode of operation is the doubling of the time required to do a full flux map. If a path transfer mechanism or its interface should fail, the effect would be limited to those thimbles normally associated with it and a sufficient map can be obtained from the remaining thimbles.

BRIEF DESCRIPTION OF THE DRAWINGS

The invention will become more readily apparent from the following exemplary description in connection with the accompanying drawings.

DESCRIPTION OF THE PREFERRED EMBODIMENT

An automatic flux mapping system consists of a control console and a detector drive system. A typical detector drive system consists of several drive units, each of which has a movable detector connected to a flexible cable. Associated with each drive unit are rotary transfer mechanisms and a number of thimbles, or hollow tubes, which protrude into the reactor core. The rotary transfer mechanisms function as mechanical multiplexers and make it possible to probe any of the core paths of the reactor core with any of the detectors. While the details of the detectors and respective drive units are not illustrated herein, the operation of the detectors and the operation and processing information are described and illustrated in U.S. Pat. No. 3,858,191, entitled "Digital Muliplexed Position Indication and Transmission System", issued Dec. 31, 1974, assigned to the assignee of the present invention and incorporated herein by reference.

Similarly, U.S. Pat. No. 3,932,211, issued Jan. 13, 1976, entitled "Method Of Automatically Monitoring The Power Distribution Of A Nuclear Reactor Employing Movable In-Core Detectors", and assigned to the assignee of the present invention is incorporated herein by reference.

As described in the above-referenced U.S. Pat. No. 3,932,211, the detectors are inserted into the reactor core region during normal power operation according to a predetermined, intermittent, time program. Upon insertion, the detectors are automatically driven through the core region along predetermined paths. The outputs of the detectors are recorded as a function of core location to provide a representation of the reactor power distribution.

A system may typically consist of 4, 5 or 6 detector/drive assemblies, depending upon the size of the plant, which are interconnected in such a fashion that they can access various combinations of in-core flux thimbles. To obtain the thimble interconnection capability, each detector has associated with it a five path and a ten path rotary mechanical transfer mechanism. A core map is made by selecting, by way of the transfer mechanisms, particular thimbles through which the detectors are driven.

Figure 1:
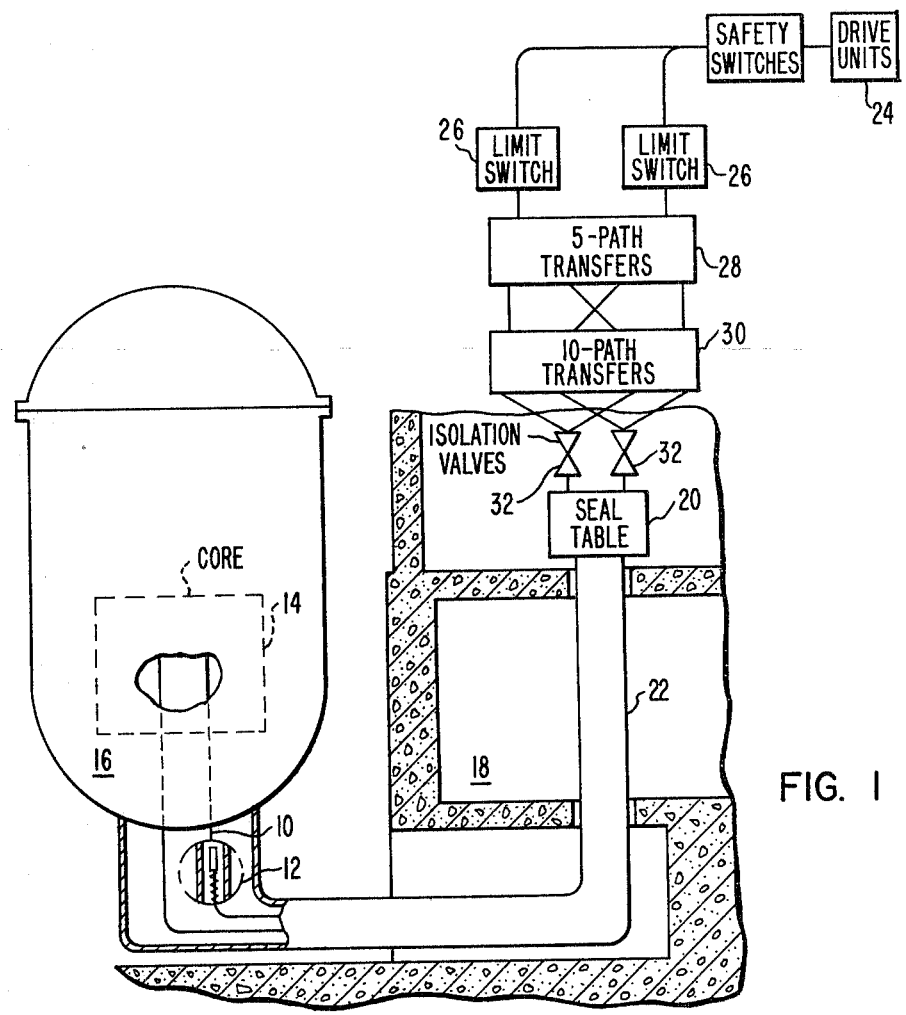
FIG. 1 is a perspective view illustrating a basic flux mapping system capable of being controlled by the positioned electronics of the invention.

FIG. 1 shows a basic system for the insertion of the movable miniature detectors, i.e. movable in-core neutron detectors. Retractable thimbles 10, into which the miniature detectors 12 are driven, take the route approximately as shown. The thimbles are inserted into the reactor core 14 through conduits extending from the bottom of the reactor vessel through the concrete shield 18 and then up to a thimble seal table 20. Since the movable detector thimbles are closed at the leading (reactor) end, they are dry inside. The thimbles thus serve as a pressure barrier between the reactor water pressure, i.e. 2500 psig design, and the atmosphere. Mechanical seals between the retractable thimbles and the conduits are provided at the seal tables 20. The conduits 22 are essentially extensions of the reactor vessel 16, with the thimbles allowing the insertion of the in-core instrumentation movable miniature detectors. During operation, the thimbles 10 are stationary and will be retracted only under depressurized conditions during refueling or maintenance operations. Withdrawal of a thimble to the bottom of the reactor vessel is also possible if work is required on the vessel internals.

The drive system for the insertion of each miniature detectors includes basically a drive unit 24, limit switch assemblies 26, a five path rotary transfer mechanism 28, a ten path rotary transfer mechanism 30, and isolation valves 32 as illustrated in FIG. 1.

Each drive unit pushes a hollow helical-wrap drive cable into the core with a miniature detector attached to the leading end of the cable and a small diameter coaxial cable, which communicates the detector output, threaded through the hollow center back to the trailing end of the drive cable.

As a given set of detectors enter the core, output electronics are initiated and continue monitoring the detectors' performance through the entire flux scan of that set.

Figure 2:
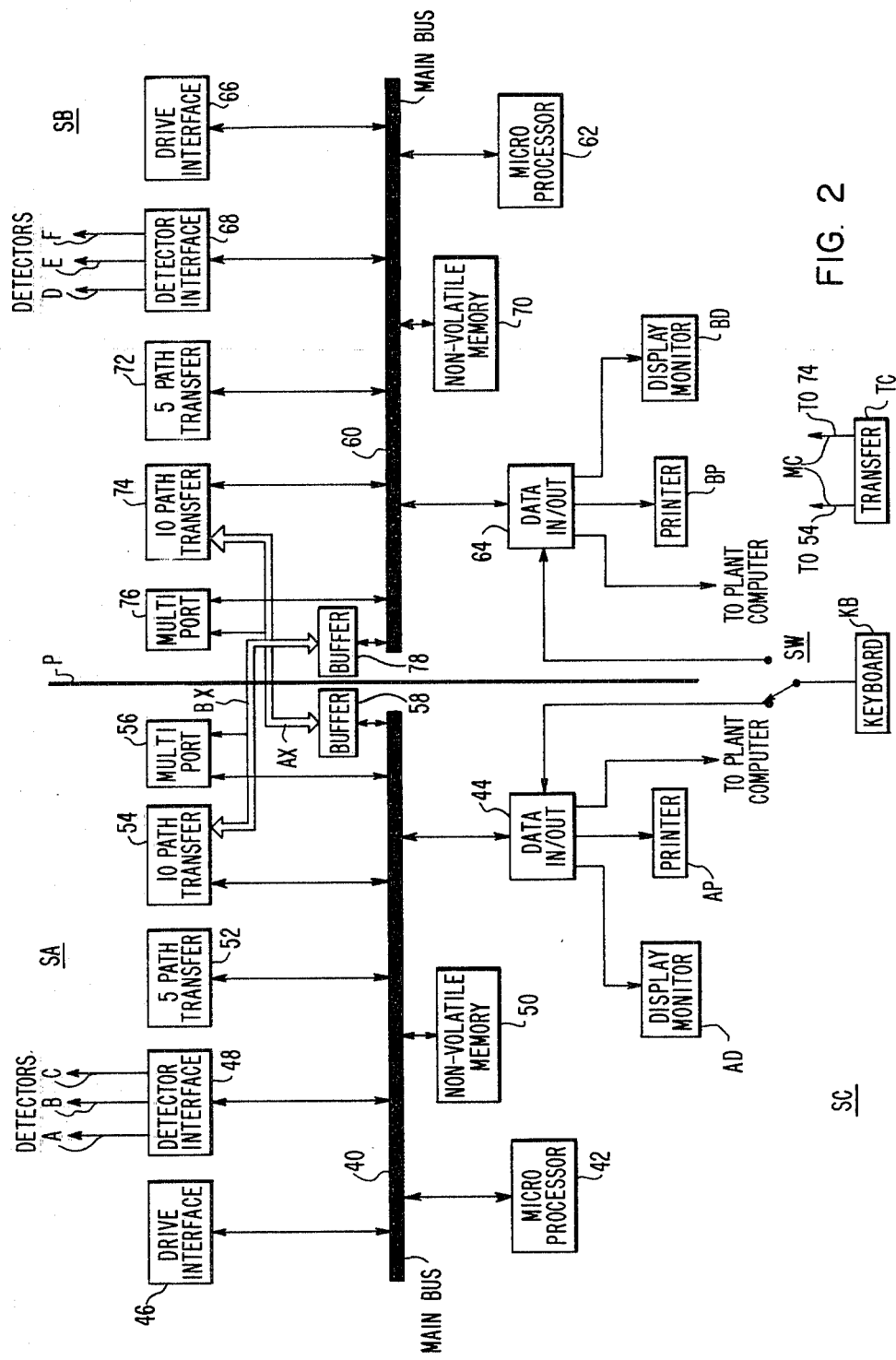
FIG. 2 is a functional block diagram of the partitioned electronics of an automatic flux mapping system in accordance with the invention.

The function of the automatic flux mapping system console SC, which is illustrated in FIG. 2, is to automatically probe all of the required core paths, record the measurements or readings from the detectors, and present this information to the system operator and the plant computer.

The system console SC of FIG. 2 is divided into two relatively independent subsystems SA and SB, each of which basically controls one-half of the drive mechanisms. In the event of a single fault, or failure of one of the subsystems, the other subsystem assumes the duties of the inoperative subsystem after it has accomplished its own function. This backup flexibility is made possible because the drive mechanism illustrated in FIG. 1 accommodates the switching of a detector from its normal paths to those normally probed by another detector through the use of the rotary transfer mechanisms of FIG. 1.

The five path transfer mechanisms associated with the detectors controlled by each subsystem includes a path for accessing the ten path transfer mechanisms of the other subsystem.

In the event one subsystem becomes inoperative an operator initiated signal will cause the microprocessor controlling the operative subsystem to rotate its five path transfer mechanisms to gain access to the ten path transfer mechanisms of the inoperative subsystems. The operative subsystem will then cause its detectors to probe not only the thimbles associated with its ten path transfer mechanisms but also the thimbles associated with the ten path transfer mechanisms of the inoperative subsystem.

In order to preserve the fault tolerant capability of the console system SC, it is desirable to isolate subsystem SA and SB from one another. While it is desirable to achieve both electrical and physical isolation between the subsystems SA and SB, the operator or user prefers a unified system. Recognizing this concept, the subsystems SA and SB each typically includes a separate high-speed printer AP and BP respectively, and a separate cathode ray tube display AD and BD, respectively. A single keyboard KB is used to provide operator communications with the subsystems SA and SB through the operator controlled switch SW.

For operation in the event of a failure of one subsystem, a single operator command MC to the other subsystem via the manually operated transfer circuit TC, will cause remaining subsystem to generate a full flux map by means of a simple communications and control link between subsystems SA and SB. For all other operations, the operator will interact with only one subsystem. Each subsystem consists of a single main bus 40 and 60 driven by a microprocessor 42 and 62 respectively. The microprocessors 42 and 62 may be typically implemented through the use of the commercially available Intel Model 8080 microprocessor. Since it is necessary under fault conditions for one subsystem to control the other subsystem's transfer path mechanisms, a small auxiliary bus crosses the partitioned operational boundary P between the subsystems SA and SB. The auxiliary buses AX and BX are buffered, or isolated, from the main subsystem buses 40 and 60 so that a fault cannot cause failure of the respective parent subsystem. The auxiliary buses AX and BX are also used to facilitate limited data transfer between subsystems SA and SB.

Referring to the block diagram schematic of FIG. 2, the subsystems SA and SB comprise identical subsystem electronic circuits physically and operationally isolated by partition P which indeed may be more than an electrical partition and may take the form of a physical partition. A limited amount of intercommunications is provided between the subsystems SA and SB via auxiliary buses AX and BX which are coupled to the main buses 40 and 60 via the buffer/isolator circuits 58 and 78, respectively.

The intelligence of the respective subsystems SA and SB corresponds to the microprocessors 42 and 62. The subsystem functions corresponding to drive interface circuits 46 and 66, detector interface circuits 48 and 68, and data in/out circuits 44 and 64 correspond to components and functions of conventional flux mapping systems and will be discussed herein only to the extent that they represent basic elements in a flux mapping system.

In the partitioned subsystems of FIG. 2, subsystem SA is associated with the control and readout of detectors A, B, and C while subsystem SB is associated with the control and readout of detectors D, E, and F. The drive interface 46 controls the drive units associated with detectors A, B and C while detector interface 48 supplies electrical excitation to the detectors and transmits data information from the detectors to the main bus 40. Similarly, drive interface 66 of subsystem SB controls the drive units associated with detectors D, E and F while detector interface 68 provides electrical excitation to the detectors and transmits the data from the detectors D, E and F to the main bus 60. Microprocessors 42 and 62 function to interpret and process the information transmitted to the buses 40 and 60 respectively from the detector interface circuits 48 and 68 and make such information available through the data in/out circuits 44 and 64, respectively, to the plant computer (not shown), the display monitors AD and BD, and the printers AP and BP. The implementation of the data in/out circuits 44 and 64 is a matter of design choice and can be realized through any one of numerous state of the art techniques. Suitable commercial circuits include the Intel 8255, parallel input/output device, and Intel 8251, universal synchronous/asynchronous receiver/transmitter.

The five path transfer circuits 52 and 72 and the ten path transfer circuits 54 and 74 of the subsystems SA and SB, respectively, function to control the first level of mechanical multiplexing identified as the five path transfer mechanisms 28 of FIG. 1 and the second level of mechanical multiplexing identified as ten path mechanisms 30 of FIG. 1 for the core mapping responsibility associated with the detectors of the respective subsystems SA and SB.

The non-volatile memories 50 and 70 of subsystems SA and SB respectively, perform a significant function in making the partitioned electronics illustrated in FIG. 2 a practical approach for economically providing a fault tolerant automatic in-core flux mapping system for use in nuclear power plants.

As described above, the objective of the partitioned electronics is to enable one operating subsystem to not only accomplish the flux mapping duties associated with its detectors while making operational status information available to the other subsystem but, in the event of failure of the other subsystem, cause its detectors to probe the flux thimbles normally assigned to the detectors associated with the inoperative subsystem to assure completion of the total core flux mapping.

Thus, since each subsystem is designed to control essentially half of the total detectors, when there is a failure of one of the subsystems thus requiring the remaining subsystem to produce a total flux map, the remaining operative subsystem must know all the various limits and paths associated with the detectors of the inoperative subsystem. It would impractical to store all such information in such devices as thumbwheel switches. Furthermore, it is desirable that such stored information be retained in the event of a power failure. To satisfy these objectives, the non-volatile memories 50 and 70, which are typically comprised of semiconductor read-only memories, such as commercially available NCR2450, store information concerning the limits and paths of both the detectors associated with its subsystem as well as those associated with the detectors of the other subsystem. Thus, the non-volatile memory 50 contains not only the limits and path information for detectors A, B and C of subsystem SA but also contains the similar information for detectors D, E and F of subsystem SB. Likewise, non-volatile memory 70 of subsystem SB contains path and limits information for the detectors D, E and F of subsystem SB and similar information for the detectors A, B and C of subsystem SA. The information stored in the non-volatile memories 50 and 70 can be changed by the operator through keyboard KB.

While the subsystems SA and SB are capable of operating independently, optimum performance dictates that they be coordinated thus requiring cross-communications between the subsystems SA and SB. This cross-communication is accomplished via auxiliary buses AX and BX through the multiport circuits 56 and 76, and the buffer circuits 58 and 78 of subsystems SA and SB, respectively. The function of these circuits is primarily to coordinate mechanical movement of the detectors associated with the subsystems and to process data developed by the respective detectors. Communication between two microprocessor based systems typically would involve the presentation of information from one subsystem to a second subsystem and a delay until the second subsystem accepts the data and acknowledges acceptance of the data. Unfortunately, this typical approach would tie the subsystems SA and SB together in such a manner that a failure in one subsystem would interrupt the proper operation of the other subsystem. It is thus desired to operate the subsystem's asynchronously for fault tolerance. For this purpose, a "mailbox" technique is utilized using the multiport circuits 56 and 76. The multiport circuits 56 and 76 function as storage registers such that data or information from one subsystem is deposited in the multiport circuit of the other subsystem via the appropriate auxiliary bus thus permitting the data initiating subsystem to go about its predetermined tasks without waiting for an acknowledged acceptance of the data from the second subsystem. The second subsystem in turn can retrieve the data stored from its multiport circuit at any time it deems appropriate.

The multiport circuits 56 and 76 permit coordination of the operation of the subsystems SA and SB when both subsystems are operational. The microprocessors use the multiport circuits to exchange subsystem status information between the subsystems. The status information includes information as to which flux thimbles are being probed at any given time, gain factors associated with the respective detectors, diagnostic information as to the operational integrity of the subsystems, etc. The multiport circuits 56 and 76 provide a small "data window".

The reactor core 116 of FIG. 1 will include at least one calibration thimble. The status information exchange via the multiport circuits 56 and 76 will include information as to presence of a detector in the calibration thimble to avoid an attempt to insert a second detector in the calibration thimble.

The auxiliary buses AX and BX also provide a cross-control mode between the subsystems SA and SB in the event of a failure in one of the subsystems as described above.

While the control and communication across partition P between the subsystems SA and SB is essential, it is also necessary to provide a buffer between the subsystems. The buffer assures the desired communication and control while preventing fault conditions associated with an inoperative subsystem from being fed back to the main bus of the operative subsystem and interfering with the proper operation of the operative subsystem. This buffering is the function of buffer circuits 58 and 78 which are associated with the main buses 40 and 60 of subsystems SA and SB, respectively.

Figure 3:
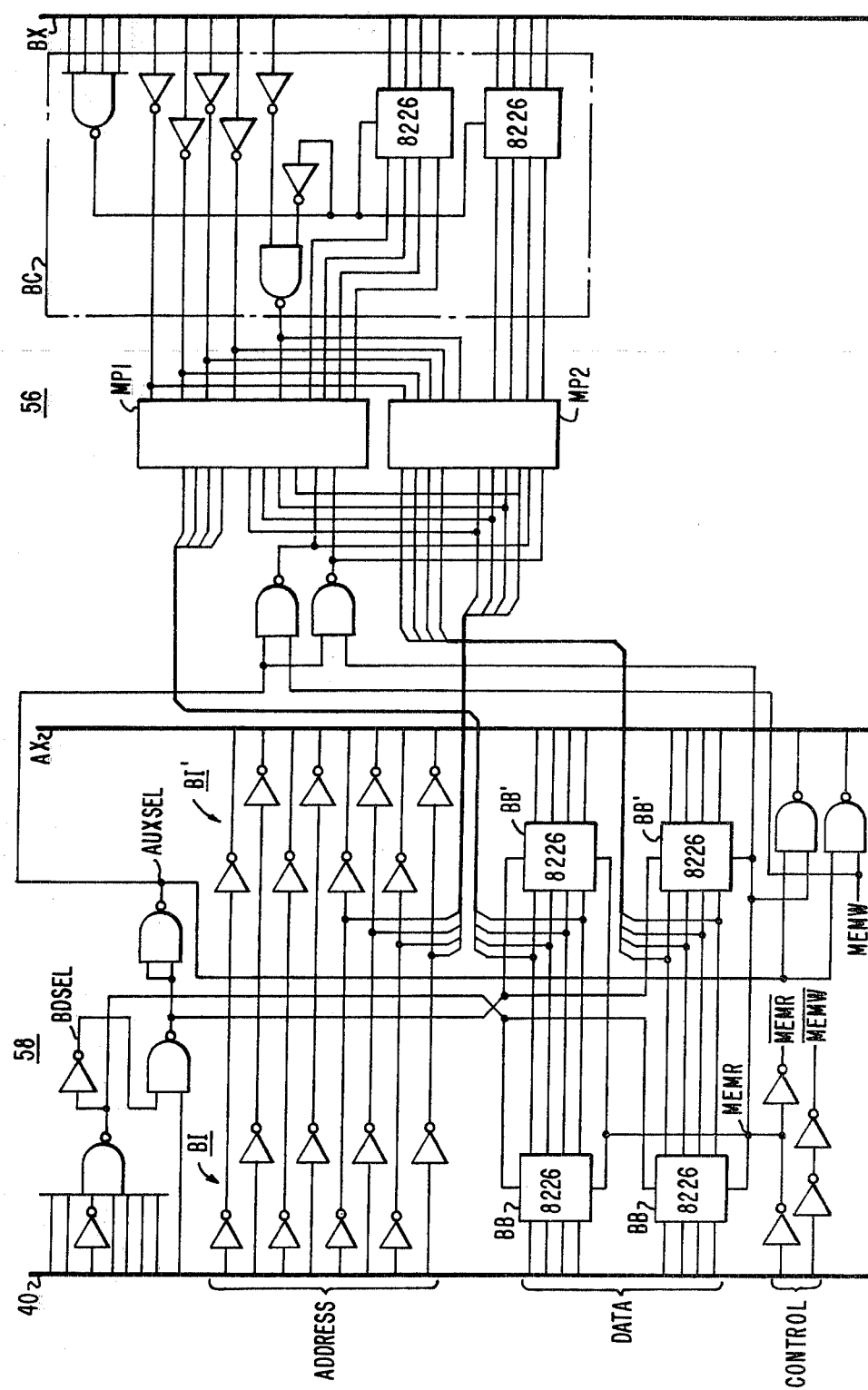
FIGS. 3 and 4 are schematic illustrations of typical implementations of a portion of the partitioned electronics of FIG. 2.
Figure 4:
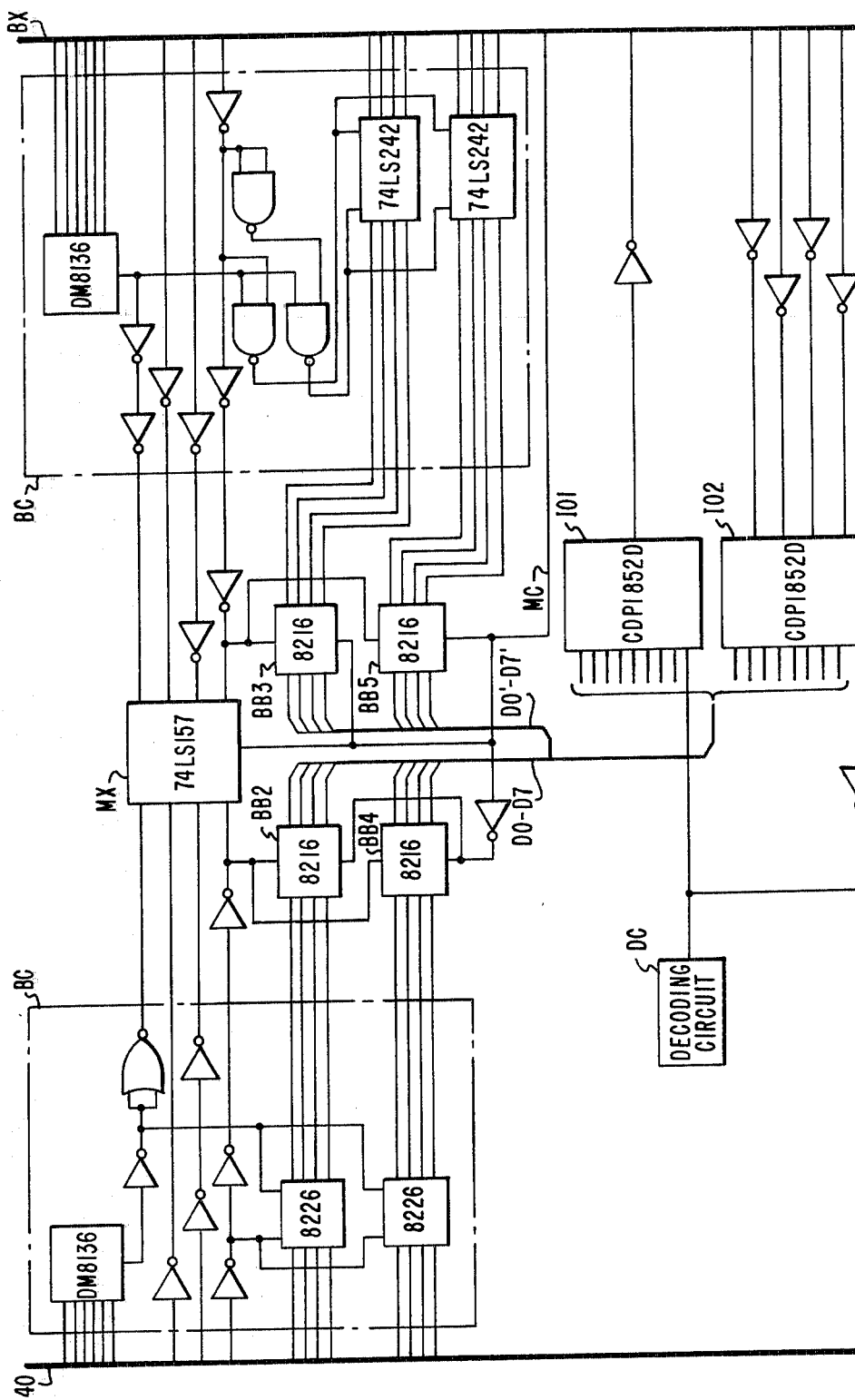

Typical implementations of the circuits of FIG. 2 which are required to provide the communication control between the microprocessor controlled subsystems SA and SB are schematically illustrated in FIGS. 3 and 4.

Referring to FIG. 3, there is schematically illustrated a typical implementation of a buffer circuit suitable for satisfying the operation of buffer circuits 58 and 78 in combination with a typical implementation of a multiport circuit suitable for satisfying the operation of multiport circuits 56 and 76. For the purpose of discussion, it will be assumed that the circuit illustrations of FIG. 3 correspond to multiport circuit 56 and buffer circuit 58.

The information stored in any computer element such as the microprocessors 42 and 62 of subsystems SA and SB, respectively, is bidirectionally transferred to other parts of the system by means of control and data words. Referring to FIG. 3, an eight-bit address from the microprocessor 42 is buffered via an array of inverters BI which permit unilateral communications between the main bus 40 and the auxiliary bus AX. The data lines require two-way communication between the main bus 40 and the auxiliary bus, thus requiring a more complex buffering circuit. Thus, bidirectional buffers BB, which can be implemented by commercially available bidirectional buffers, such as the Intel 8226, are employed to provide the data communication between the main bus 40 and the auxiliary bus AX. The use of inverters BI' and bidirectional buffers BB' between the main bus 40 and the auxiliary bus AX are included to buffer the signal communications between the multiport circuit 56 and the auxiliary bus AX.

The multiport circuit 56, or multiport register, provides a means by which subsystem microprocessor 42 can store information, or messages for microprocessor 62, and can read stored information entered by the microprocessor 62. The multiport circuit 56 consists of two multiport registers MP1 and MP2 which combine to provide an eight-bit capability. The multiport registers MP1 and MP2 correspond to commercially available circuits such as the Advanced Micro Devices component AM-29705. The multiport registers MP1 and MP2 have two separate address buses, such that one is capable of reading or writing via the data lines of the buffer circuit 58 of the main bus 40 while the second address bus reads data supplied by microprocessor 62 via the auxiliary bus BX. The function and implementation of the buffer circuit BC is comparable to that of circuit 58. Each circuit coupled to the main and auxiliary buses of subsystems A and B will typically include a buffer circuit BC to prevent circuit faults from excessively loading the microprocessors and adversely affecting the operation of the remaining circuits of the system SC.

The schematic embodiment of FIG. 4 depicts typical implementation of circuitry to permit transfer of control of the system of the ten path transfer mechanisms associated with one subsystem to the operational control of the other subsystem in response to the operator initiated command MC. Referring to FIG. 4, the control of the ten path transfer mechanisms associated with the ten path transfer circuit 54 of subsystem SA is provided by microprocessor 42 via bidirectional buffer circuits BB2 and BB4 which are coupled to the main bus 40 by a buffer circuit BC. The data outputs D0–D7 are supplied to the bidirectional latch input/ouput circuits IO1 and IO2. The input/output circuits IO1 and IO2 can be implemented through the use of RCA circuits CDP 1825 D. Decoding circuit DC selects which of the circuits IO1 and IO2 is to be operational. Circuit IO1 operates to rotate the ten path transfer mechanism while circuit IO2 functions to receive codes which give feedback to determine the position to the mechanism.

The operator can manually transfer the control of the ten path transfer mechanism associated with subsystem SA from the microprocessor 42 to the microprocessor 62 by initiating a change of state of the logic signal MC. The operator transfers control to the microprocessor 62 through auxiliary bus BX, a buffer circuit BC' and bidirectional buffer circuits BB3 and BB5 which transmit the data signals D0'–D7' to circuits IO1 and IO2. Circuits BB2–BB5 can be implemented through the use of Intel circuit 8216.

In addition to functioning as buffers, circuits BB2–BB5, as illustrated in FIG. 4, function as multiplexers for the data associated with the ten path transfer mechanism operation.

A commercially identified multiplexer circuit MX functions to multiplex the address and control information associated with the data information of circuits BB2–BB5.

Buffers BB2–BB5 are operated from an independent power supply so that the devices IO1 and IO2 may be operated and also so that they may be operated from source BX even if source 40 and its associated buffers fail. Similarly, the buffers associated with the main bus 40 and auxiliary bus BX are each operated with separate power supplies associated with the respective buses. This is to assure that a failure of the components of the ten path mechanism circuits do not affect operation of either bus.

We claim:

1. In a nuclear reactor flux mapping system for developing a reactor flux map on the basis of flux measurement information from movable in-core detectors which probe flux thimbles of a reactor core, the combination of,
   at least a first and second group of movable in-core flux measuring detectors,
   first and second multi-path transfer mechanisms operatively associated with said first and second group of detectors respectively, said multi-path transfer mechanisms mechanically directing the detectors to the flux thimbles to be probed by the detectors,
   a partitioned electronics system including:
   (a) a first subsystem operatively connected to said first multi-path transfer mechanisms for controlling the positioning of said first group of detectors within a first set of flux thimbles to probe said thimbles and generate information corresponding to a first portion of said flux map, (b) a second subsystem operatively connected to said second multi-path transfer mechanisms controlling the positioning of said second group of detectors within a second set of flux thimbles to probe said thimbles and generate information corresponding to a second portion of said flux map, (c) a memory means associated with each of said subsystems, each memory means including as stored information the information corresponding to the detector positions within both said first and second set of flux thimbles to derive said first and second portions of said flux map, buffered circuit means operatively coupling said first and second subsystems while isolating each subsystem from fault conditions in the other subsystem, control means connected to said buffered circuit means such that one subsystem may be selected to probe both the first and second set of flux thimbles with the group of detectors associated with the selected subsystem thereby providing the capability of developing said flux map by the detectors of one of said subsystems in the event of a malfunction of the other of said subsystems, means for generating a transfer signal to select said first or second subsystem to generate flux measuring information corresponding to both said first and second portions of said flux map, and communications means connected to said buffered circuit means to provide data communications between said first and second subsystems to make available status information of the flux mapping operation of each subsystem available to the other subsystem to coordinate. The operation of the subsystems.

2. In a system as claimed in claim 1 wherein said first and second subsystems each includes a microprocessor means, each microprocessor means controlling the positioning of the group of detectors associated with its subsystem to probe its assigned flux thimbles, and responding to a signal from said means to position its detectors to probe the assigned flux thimbles of the other subsystem.

3. In a system as claimed in claim 1 wherein said memory means are non-volatile memory means.

4. In a system as claimed in claim 1 further including input means operatively connected to said memory means to permit operator initiated changes in the stored information.

5. In a system as claimed in claim 1
wherein said multi-path transfer mechanisms associated with each group includes a first and second level multi-path transfer mechanism associated with each detector, said second level multi-path transfer mechanism functioning as a mechanical multiplexer to direct the detector to the assigned flux thimbles, said transfer signal of said means placing the second level transfer mechanisms of one subsystem under the control of the microprocessor means of the other subsystem to permit the probing of the flux thimbles assigned to said second level transfer mechanism by the detectors controlled by the microprocessor means of the subsystem selected by said transfer signal.

* * * * *